United States Patent [19]

Mehansho et al.

[11] Patent Number: 5,670,344

[45] Date of Patent: Sep. 23, 1997

[54] PREVENTING UNDESIRED COLOR FORMATION IN IRON FORTIFIED CHOCOLATE-FLAVORED BEVERAGES BY INCLUDING EDIBLE ACIDS OR THEIR SALTS

[75] Inventors: Haile Mehansho, Fairfield; Renee Jane Irvine, Cincinnati, both of Ohio

[73] Assignee: The Procter & Gamble Company, Cincinnati, Ohio

[21] Appl. No.: 595,716

[22] Filed: Feb. 2, 1996

[51] Int. Cl.$^6$ .................................................. A23L 1/304
[52] U.S. Cl. ................................................ 426/74; 426/593
[58] Field of Search ....................................... 426/593, 74

[56] References Cited

U.S. PATENT DOCUMENTS

| | | | |
|---|---|---|---|
| 3,734,742 | 5/1973 | Morse et al. | 99/28 |
| 3,758,540 | 9/1973 | Martell | 260/439 R |
| 4,020,158 | 4/1977 | Ashmead et al. | 424/177 |
| 4,172,072 | 10/1979 | Ashmead | 260/115 |
| 4,183,947 | 1/1980 | Cockerill | 424/295 |
| 4,201,793 | 5/1980 | Ashmead | 426/92 |
| 4,208,405 | 6/1980 | Found | 424/177 |
| 4,216,144 | 8/1980 | Ashmead | 260/115 |
| 4,599,152 | 7/1986 | Ashmead | 204/72 |
| 4,830,716 | 5/1989 | Ashmead | 204/72 |
| 4,863,898 | 9/1989 | Ashmead et al. | 514/6 |
| 4,992,282 | 2/1991 | Mehansho et al. | 426/72 |
| 5,002,779 | 3/1991 | Mehansho et al. | 426/72 |
| 5,110,965 | 5/1992 | Thunberg et al. | 556/148 |
| 5,278,329 | 1/1994 | Anderson | 556/50 |

OTHER PUBLICATIONS

Webb et al. 1965. Fundamentals of Dairy Chemistry, Westport, CN, Avi Publishing Corp. pp. 140–145.

Douglas, Jr. et al.; Color, Flavor and iron bioavailability in iron-fortified chocolate milk; *Journal of Dairy Science*; pp. 1785–1793; vol. 64, No. 9, 1981.

MacPhail et al.; Fortification of the diet as a strategy for preventing iron deficiency; *Acta Paediatr Scand Suppl.*; 361: pp. 114–124; 1989.

Hurrell et al.; Iron fortification of infant cereals: a proposal for the use of ferrous fumarate or ferrous succinate; *Am. J. Clin. Nutr.*; 1989; 49; pp. 1274–1282.

Hurrell et al.; Ferrous fumarate fortification of a chocolate drink powder; *British Journal of Nutrition*; 1991; 65; pp. 271–283.

Hurrell et al.; Strategies for iron fortification of foods; *Trends in Foods Science & Tech.*; Sep. 1990; pp. 56–61.

Windisch et al.; Influencing the bioavailability of iron through substances contained in foods; *AID–Verbraucherdienst*; vol. 29, No. 10; 1989; pp. 201–207.

Brodan et al.; Influence of fructose on iron absorption from the digestive system of healthy subjects; *Nutri. Dieta* 9; pp. 263–270; 1967.

Matzkies et al.; On the improvement of the absorption of divalent iron using an iron-enriched, vitamin–C–containing fruit juice; *Ernährungs–Umschau*; vol. 31, No. 11; pp. 373–374; 1984.

*Primary Examiner*—Helen Pratt
*Attorney, Agent, or Firm*—Eric W. Guttag

[57] ABSTRACT

Nutritional chocolate-flavored beverage mixes and other edible mixes that are fortified with highly bioavailable sources of iron such as ferrous fumarate and ferrous sulfate, yet do not develop undesirable gray color when the beverage mix is reconstituted with water or milk, even when the water or milk has been boiled. This problem of gray color development is solved by including edible acids such as citric or malic acid as buffering agents in the beverage mix so that the pH of the reconstituted chocolate beverage is about 6.5 or less. An additional benefit of including these edible buffering acids/salts is that they tend to stabilize the chocolate aroma in the reconstituted beverage. Inclusion of these edible buffering acids/salts in ready-to-serve chocolate-flavored beverages fortified with these highly bioavailable iron sources also prevents the formation of undesirable gray color.

8 Claims, No Drawings

PREVENTING UNDESIRED COLOR FORMATION IN IRON FORTIFIED CHOCOLATE-FLAVORED BEVERAGES BY INCLUDING EDIBLE ACIDS OR THEIR SALTS

TECHNICAL FIELD

This application relates to chocolate-flavored edible mixes or powders, in particular chocolate-flavored beverage mixes or powders, fortified with sources of highly bioavailable iron. This application especially relates to preventing undesired gray color formation when these iron fortified edible mixes/powders are reconstituted with aqueous liquids such as water or milk. This application further relates to preventing undesired color formation in ready-to-serve chocolate flavored beverages fortified with these highly bioavailable iron sources.

BACKGROUND OF THE INVENTION

Iron deficiency continues to be a common nutritional problem at the present time. Iron deficiency is a major problem in the developing world and affects almost all segments of the population. It is particularly severe in infants and childbearing women. See MacPhail and Bothwell, "Fortification of the Diet as a Strategy for Preventing Iron Deficiency," *Acta Paediatric Scand. Supplement*, 361: 114 (1989).

Even in industrialized countries, one segment of the population that remains highly vulnerable to iron deficiency is school-aged children because their requirements for iron for growth often exceed the dietary supply of iron. Iron requirements for adolescents can be increased further by strenuous athletic programs and, in turn, their athletic performance can be impaired by the development of iron deficiency. See Hurrell, "Ferrous Fumarate Fortification Of A Chocolate Drink Powder," *British Journal of Nutrition*. 65: 271 (1991)

Several strategies have been proposed to reduce the prevalence of iron deficiency in schoolchildren. Although iron supplements are effective, logistics and compliance are major problems. In addition, the prevalence of iron deficiency is not usually high enough to justify the use of medicinal iron. The iron intake of children can be increased by fortifying a dietary staple such as wheat products or by fortifying a widely consumed food such as sugar, but this can be too costly for developing countries. Hurrell, supra, suggests that the most cost-effective approach to increase iron intake in children is fortification of a specialty food item that is used selectively in this age group. This food item should be appealing to children and ideally should provide other nutritional benefits.

One such item proposed by Hurrell, supra, is chocolate-flavored milk beverages. The consumption of this product is largely limited to school-age children and would not be consumed by adult men who seldom require additional iron. In addition, chocolate-flavored milk would also increase the intake of other minerals and vitamins such as zinc and calcium that are desirable for children.

As noted by Hurrell, supra, there are well-recognized problems associated with fortifying foods and beverages with iron, including chocolate milk drinks. This is particularly true of highly bioavailable iron sources (e.g., ferrous sulfate, ferrous gluconate, etc.) that are commonly used to fortify foods tend to discolor foodstuffs, or to be organoleptically unsuitable. Fortifying foods and, especially, beverages, that contain fats with these iron sources can be very difficult as these materials tend to interact, with the fats typically being oxidized to produce off-flavors. This interaction not only affects the organoleptic and aesthetic properties of the foods and beverages, but also undesirably affects the nutritional bioavailability of these materials. However, the use of inert iron sources (reduced iron, ferric pyrophosphate, etc.) that cause little or no organoleptic problems are poorly absorbed from the gut. The challenge is to fortify foods with highly bioavailable iron sources without adversely affecting the color or taste of the product.

Hurrell, supra, proposes fortifying chocolate drink powders with ferrous fumarate as the iron fortificant. When these ferrous fumarate fortified chocolate drink powders were reconstituted with cold or hot (80° C.) water or milk, the reconstituted beverage was judged acceptable as to color and flavor. However, when these ferrous fumarate fortified chocolate drink powders were reconstituted with boiling water or milk, Hurrell, supra, says the reconstituted beverage "changed color from red/brown to an unacceptable gray." See Id. at page 275. Chocolate drink powders fortified with highly bioavailable ferrous sulfate will also cause the development of an undesirable gray color when reconstituted in water or milk.

Accordingly, it would be desirable to provide chocolate drink powders fortified with highly bioavailable iron sources such as ferrous sulfate and ferrous fumarate that do not develop an undesirable gray color when reconstituted with aqueous liquids such as water or milk, even when the water or milk has been heated to the boiling point.

DISCLOSURE OF THE INVENTION

The present invention relates to nutritional chocolate-flavored edible mixes, especially beverage mixes, that are fortified with highly bioavailable sources of iron. These mixes comprise:

(a) a flavor enhancing amount of cocoa (b) a nutritionally effective amount of an iron source selected from ferrous sulfate, ferrous fumarate, ferrous succinate, ferrous gluconate, ferrous lactate, ferrous tartarate, ferrous citrate, ferrous amino acid chelates, ferric saccharate, ferric ammonium citrate, ferric citrate, ferric sulfate, and mixtures thereof;

(c) from 0 to about 25% milk solids;

(d) an effective amount of a sweetener (e) a buffering agent selected from edible buffering acids, water-soluble salts of edible buffering acids, and mixtures thereof in an amount sufficient such that the edible mix, when dissolved in an aqueous liquid provides a pH from about 3.0 to about 6.5.

The present invention further relates to nutritional ready-to-serve chocolate flavored beverages. These ready-to-serve beverages comprise:

(a) a flavor enhancing amount of cocoa (b) a nutritionally effective amount of an iron source selected from ferrous sulfate, ferrous fumarate, ferrous succinate, ferrous gluconate, ferrous lactate, ferrous tartarate, ferrous citrate, ferrous amino acid chelates, ferric saccharate, ferric ammonium citrate, ferric citrate, ferric sulfate, and mixtures thereof;

(c) from 0 to about 25% milk solids;

(d) an effective amount of a sweetener (e) a buffering agent selected from edible buffering acids, water-soluble salts of edible buffering acids, and mixtures thereof in an amount sufficient to provide a pH from about 3.0 to about 6.5 in the beverage (f) from about 60 to about 98% of an aqueous liquid.

The present invention solves the problem of fortifying chocolate-flavored edible mixes, especially beverage mixes, as well as ready-to-serve chocolate-flavored beverages, with highly bioavailable iron sources (e.g., ferrous sulfate and ferrous fumarate) without developing an undesirable gray color when the edible mix is reconstituted with aqueous liquids such as water or milk, even when the water or milk has been heated to the boiling point. Surprisingly, it has been found that the problem of undesired gray color development is pH dependent and thus reversible. This problem of reversible color development is solved by including edible acids (e.g., citric or malic acid) as buffering agents in the edible mix so that the pH of the reconstituted chocolate-flavored product (e.g., beverage) or ready-to-serve chocolate-flavored beverage is about 6.5 or less. An additional benefit of including these edible buffering acids/salts is that they tend to stabilize the chocolate aroma in the reconstituted product or ready-to-serve beverage. This is accomplished without affecting the flavor of the reconstituted product or ready-to-serve beverage.

DETAILED DESCRIPTION OF THE INVENTION

A. Definitions

As used herein, the term "chocolate-flavored edible mix" means a chocolate-flavored food or beverage mix that, alone or in combination with other edible ingredients, can be reconstituted with an aqueous liquid or diluent, i.e., water, milk or other aqueous medium, to provide a chocolate-flavored consumable product. Chocolate-flavored edible mixes according to the present invention can be used in the preparation of various chocolate-flavored products, including cereal products, baby foods or formulas, puddings, ice cream, dips, syrups, pie and other dessert fillings, frostings, cake, cookie mixes and brownie mixes, and beverages. Particularly preferred chocolate-flavored edible mixes according to the present invention are chocolate-flavored beverage mixes that can be reconstituted to provide chocolate-flavored beverages.

As used herein, the term "total water" means the total water present in the dry mix that includes the water present in the cocoa, minerals (e.g., iron), emulsifiers, sugars, milk solids, other minerals and vitamin preparations and other ingredients.

As used herein, the term "total fat" means the total fat present in the dry mix that includes the fat present in emulsifiers, minerals, vitamin preparations, sweeteners, cocoa, milk solids and other dry ingredients.

As used herein, the term "reconstituted product or beverage" means the product or beverage that is prepared by mixing the dry edible mix of the present invention with an aqueous liquid or diluent, i.e., water, milk or other aqueous medium, e.g., coffee, tea or fruit juice. The dry mix can be diluted typically at a ratio of from about 0.2:10 to about 3:10 of dry mix to liquid or diluent, e.g., water or milk.

As used herein, the term "ready-to-serve beverage" refers to a beverage product that is in a drinkable form.

As used herein, the term "mixing in a dry state" means that dry or liquid ingredients are blended without adding any water, steam or other water containing solvent. The mixing should make as homogeneous a blend as possible.

As used herein, the term "comprising" means various components can be cojointly employed in the beverage mixes of the present invention. Accordingly, the terms "consisting essentially of" and "consisting of" are embodied in the term comprising.

All weights, parts and percentages used herein are based on weight unless otherwise specified.

B. Cocoa

An important component of the edible mixes and ready-to-serve beverages of the present invention is cocoa. The cocoa used in the edible mixes and beverages of the present invention can be natural or "Dutched" chocolate, or washed or fermented cocoa, from which a substantial portion of the fat or cocoa butter has been expressed or removed by solvent extraction, by pressing, or by other means. Cocoa suitable for use in the present invention can contain from about 0.5 to about 20% fatty constituents. Dutched chocolate is prepared by treating cocoa nibs with alkaline material such as potassium carbonate in a manner well known in the art. Generally, it tends to have a darker color and also can be more flavorful than natural cocoas.

Fermented cocoa powder can also be used in edible mixes and ready-to-serve beverages of the present invention. This cocoa is prepared by fermenting green cocoa beans before roasting and milling. The fermentation is usually conducted by soaking the green beans in water for a week and then drying.

Chocolate can be used as the cocoa source for edible mixes and ready-to-serve beverages of the present invention and it is intended, therefore, that chocolate, as described above, be encompassed by the term "cocoa." When chocolate is used, it should be in a finely divided form. It can also be necessary to reduce the amount of fat in the chocolate for incorporation into the dry edible mix or ready-to-serve beverage so that the total fat does not exceed 5%.

The cocoa should be heat treated to sterilize it. Any conventional pasteurization oven or pasteurization equipment for solids can be used to sterilize the cocoa. Heating the cocoa to about 110° C. for 1.5 hours to 3 hours is usually sufficient to kill bacteria, yeasts and molds.

The cocoa is included in the edible mixes and ready-to-serve beverages of the present invention in a "flavor enhancing" amount. The particular amount of the cocoa effective for providing chocolate flavor characteristics for these edible mixes or beverages ("flavor enhancing") can depend upon the flavor impression desired and the type of cocoa used. Usually the cocoa comprises from about 0.05 to about 30%, preferably from about 2 to about 20%, most preferably from about 3.5 to about 16%, of the edible mix. In the case of ready-to-serve beverages, the cocoa comprises from about 0.005 to about 3.5%, preferably from about 0.02 to about 2.5%, most preferably from about 0.05 to about 2.0% of the beverage.

C. Highly Bioavailable Iron Sources

An important component of the edible mixes and ready-to-serve beverages of the present invention is a highly bioavailable source of iron. Ferrous iron is typically better utilized by the body than ferric iron. Highly bioavailable ferrous salts that can be used in the edible mixes and ready-to-serve beverages of the present invention are ferrous sulfate, ferrous fumarate, ferrous succinate, ferrous gluconate, ferrous lactate, ferrous tartarate, ferrous citrate, ferrous amino acid chelates, as well as mixtures of these ferrous salts. While ferrous iron is typically more bioavailable, certain ferric salts can also provide highly bioavailable sources of iron. Highly bioavailable ferric salts that can be used in the edible mixes and ready-to-serve beverages of the present invention are ferric saccharate, ferric ammonium citrate, ferric titrate, ferric sulfate, as well as mixtures of these ferric salts. Combinations or mixtures of highly bioavailable ferrous and ferric salts can be used in these edible mixes and ready-to-serve beverages. The preferred sources of highly bioavailable iron are ferrous fumarate and ferrous amino acid chelates.

Ferrous amino acid chelates particularly suitable as highly bioavailable iron sources for use in the present invention are those having a ligand to metal ratio of at least 2:1. For example, suitable ferrous amino acid chelates having a ligand to metal mole ratio of two are those of formula:

where L is an alpha amino acid, dipeptide, tripeptide or quadrapeptide reacting ligand. Thus, L can be any reacting ligand that is a naturally occurring alpha amino acid selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine or dipeptides, tripeptides or quadrapeptides formed by any combination of these alpha amino acids. See U.S. Pat. No. 4,863,898 (Ashmead et al), issued Sep. 5, 1989; U.S. Pat. No. 4,830,716 (Ashmead), issued May 16, 1989; and U.S. Pat. No. 4,599,152 (Ashmead), issued Jul. 8, 1986, all of which are incorporated by reference. Particularly preferred ferrous amino acid chelates are those where the reacting ligands are glycine, lysine, and leucine. Most preferred is the feffous amino acid chelate sold under the Trade name FERROCHEL by Albion Laboratories where the reacting ligand is glycine.

In addition to these highly bioavailable ferrous and ferric salts, other sources of bioavailable iron can be included in the edible mixes and ready-to-serve beverages of the present invention. Other sources of iron particularly suitable for fortifying edible mixes and ready-to-serve beverages of the present invention included certain iron-sugar-carboxylate complexes. In these iron-sugar-carboxylate complexes, the carboxylate provides the counterion for the ferrous (preferred) or ferric iron. The overall synthesis of these iron-sugar-carboxylate complexes involves the formation of a calcium-sugar moiety in aqueous media (for example, by reacting calcium hydroxide with a sugar, reacting the iron source (such as ferrous ammonium sulfate) with the calcium-sugar moiety in aqueous media to provide an iron-sugar moiety, and neutralizing the reaction system with a carboxylic acid (the "carboxylate counterion") to provide the desired iron-sugar-carboxylate complex. Sugars that can be used to prepare the calcium-sugar moiety include any of the ingestible saccharidic materials, and mixtures thereof, such as glucose, sucrose and fructose, mannose, galactose, lactose, maltose, and the like, with sucrose and fructose being the more preferred. The carboxylic acid providing the "carboxylate counterion" can be any ingestible carboxylic acid such as citric acid, malic acid tartaric acid, lactic acid, succinic acid, propionic acid, etc., as well as mixtures of these acids.

These iron-sugar-carboxylate complexes can be prepared in the manner described in U.S. Pat. Nos. 4,786,510 and 4,786,518 (Nakel et al) issued Nov. 22, 1988, both of which are incorporated by reference. These materials are referred to as "complexes," but they may, in fact, exist in solution as complicated, highly hydrated, protected colloids; the term "complex" is used for the purpose of simplicity.

The iron source is included in the edible mixes and ready-to-serve beverages of the present invention in a "nutritionally effective" amount. By "nutritionally effective amount" is meant that the iron source is included an amount that provides a measurable, nourishing amount of iron. This is typically at least 3%, more typically at least 10% of the Recommended Daily Allowance (RDA) of the daily intake of iron and, preferably, at least 25% of the Recommended Daily Allowance (RDA). The RDA for iron is as defined in The United States of America (see Recommended Daily Dietary Allowance-Food and Nutrition Board, National Academy of Sciences-National Research Council). The serving used to calculate the RDA is 25 gm.

For the edible mixes and ready-to-serve beverages of the present invention, the nutritionally effective mount for iron will generally comprise more than about 3% of the RDA and preferably from about 10 to about 100% of the RDA, and most preferably from about 10 to about 30% of the RDA, per unit portion of the consumable product. In general, the RDA for iron ranges from 10 mg per 6 kg to 18 mg per 54–58 kg for females, depending somewhat on age. Typically, foods and beverages are supplemented with from about 10 to about 45% RDA of iron (based per serving) to account for iron that is available from other dietary sources, assuming a reasonably balanced diet.

D. Milk Solids

The edible mixes of the present invention can contain dried milk solids. (In the case of ready-to-serve beverages of the present invention, dry milk solids can be used to prepare the beverage, especially where water is used instead of milk as the aqueous liquid.) While these edible mixes can be made without milk solids, the preferred level is up to 25% of the mix. Most preferably the mix contains from about 0.5 to about 15% milk solids.

These milk solids can be prepared by drying milk to produce a mixture of the proteins, minerals, whey and other components of milk in a dry form. These solids are preferably non-fat milk solids, i.e., the solids derived from milk that has had the fat removed. Any commercial source of non-fat or other milk solids can be used. (The fat content of the milk solids is considered part of the total fat of the edible mix.)

Flow aids and other starches can be added to the milk solids to keep the powder from caking. Other desiccants can also be used. Protein supplements can be added to the milk solids to increase the protein content of the milk and the final edible mix.

E. Sweeteners

Another component of the edible mixes and ready-to-serve beverages of the present invention is a sweetener. As used herein the term "sweeteners" includes sugars, for example, glucose, sucrose, and fructose. These sugars also include high fructose corn syrup solids, invert sugar, sugar alcohols, including sorbitol, and mixtures thereof. The sweeteners typically included in the edible mixes of the present are monosaccharides and disaccharides. These include sucrose, fructose, dextrose, maltose and lactose. Other carbohydrate sweeteners can be used if less sweetness is desired. Mixtures of these sugars can also be used.

Suitable sweeteners for use in the edible mixes and ready-to-serve beverages of the present invention also include lower calorie sweeteners, either alone or combination with other caloric sweeteners such as sugars. Suitable lower calorie sweeteners include saccharin, cyclamates, acetosulfam, L-aspartyl-L-phenylalanine lower alkyl ester sweeteners (e.g., aspartame), L-aspartyl-D-alanine amides disclosed in U.S. Pat. No. 4,411,925 (Brennan et al), issued Oct. 23, 1983, L-aspartyl-D-serine amides sweeteners disclosed in U.S. Pat. No. 4,399,163 (Brennan et al), issued Aug. 16, 1983, L-aspartyl-L-1-hydroxymethylalkaneamide sweeteners disclosed in U.S. Pat. No. 4,338,346 (Brand), issued Dec. 21, 1982, L-aspartyl-1-hydroxyethylakaneamide sweeteners disclosed in U.S. Pat. No. 4,423,029 (Rizzi), issued Dec. 27, 1983, L-aspartyl-D- phenylglycine ester and antide sweeteners disclosed in U.S. Pat. No. 4,677,126 (Janusz et al), issued Jun. 30, 1987, and the like. A particularly preferred lower calorie sweetener is aspartame.

The amount of the sweetener effective (i.e., "effective amount") in the edible mixes and ready-to-serve beverages of the present invention depends upon the particular sweetener used and the sweetness intensity desired. For lower calorie sweeteners, this amount varies depending upon the sweetness intensity of the particular sweetener. For sugar (e.g., sucrose), this amount can be in the range of from about 10 to about 95%, typically from about 55 to about 70%, in the case of edible mixes and in the case of ready-to-serve beverages, typically from about 1 to about 15%. In determining the amount of sugar for the edible mixes and ready-to-serve beverages of the present invention, any sugar or other sweetener present in the flavor component (e.g., fruit juice) is also included. In general, the amount of sweetener included in the edible mixes of the present invention is in the range of from about 0.5% to about 95% while the amount of sweetener included in the ready-to-serve beverages of the present invention is in the range of from about 0.05 to about 15%.

F. Edible Buffering Acids and Salts

A key aspect of the present invention is the inclusion of edible buffering acids and/or their respective water soluble salts in the edible mix and ready-to-serve beverages. In the absence of these buffering acids/salts, the iron sources in the edible mix or beverage (e.g., ferrous sulfate and ferrous fumarate) cause the reconstituted consumable food or beverage product, or ready-to-serve beverage, to change from its desired rich brownish color to an undesired grayish color within a relatively short period of time. This undesired graying color effect has been found to be pH dependent and thus reversible by including edible buffering acids/salts.

Buffering agents suitable for pH control in the edible mixes and ready-to-serve beverages of the present invention include all food grade acids such as citric acid, malic acid, fumaric acid, adipic acid, tartaric acid, succinic acid, ascorbic acid, phosphoric acid, the water soluble salts of these acids (especially the sodium and potassium salts), as well as mixtures of these acids and/or salts. Particularly preferred buffering acids/salts are citric acid and malic acid. These buffering acids/salts are included in the edible mix in an amount sufficient such that, when the edible mix is dissolved in an aqueous liquid (e.g., water or milk), the aqueous liquid has a pH in the range of from about 3.0 to about 6.5. (In the case of ready-to-serve beverages, the buffering acids/salts are included in amount sufficient such that the beverage has a pH in the range of from about 3.0 to about 6.5.) Within this pH range, it has been found that the reconstituted edible product, or ready-to-serve beverage, does not change from the desired rich brownish color to the undesired grayish color. The particular mount of buffering acid/salt that needs to be included in the edible mix or ready-to-serve beverage to achieve this pH depends upon a number of factors, including the buffering acid/salt used, the amount of the iron source included, the pH of the liquid used to reconstitute the edible mix or to prepare the ready-to-serve beverage, and like factors. Preferably, the buffering acid/salt salt is included in an amount sufficient to provide a pH in the range of from about 5 to about 6 for ready-to-serve beverages or for reconstituted products when the edible mix is dissolved in the aqueous liquid.

G. Optional Noncocoa Flavors

The chocolate-flavored edible mixes and ready-to-serve beverages of the present invention can further comprise flavors other than cocoa. As used herein, the term "flavors" includes both fruit and botanical flavors other than cocoa.

The term "fruit flavor" refers to those flavors derived from the edible reproductive part of a seed plant, especially one having a sweet pulp associated with the seed. Also included within the term "fruit flavor" are synthetically prepared flavors made to simulate fruit flavors derived from natural sources.

The term "botanical flavor" refers to flavors derived from parts of a plant other than the fruit; i.e., derived from bean, nuts, bark, roots and leaves. Also included within the term "botanical flavor" are synthetically prepared flavors made to simulate botanical flavors derived from natural sources. Examples of noncocoa botanical flavors are vanilla, coffee, cola, tea, and the like. Botanical flavors can be derived from natural sources such as essential oils and extracts, or can be synthetically prepared.

Flavors that complement chocolate flavor can be particularly suitable for inclusion in the edible mixes and ready-to-serve beverages of the present invention. These complementary flavors include mint, caramel, malt extract, coffee, toffee, creamy, cinnamon and nut flavors, as well as mixtures of these flavors. Other desirable flavors include vanilla, strawberry, cherry, pineapple, banana, as well as mixtures of these flavors.

These noncocoa flavors can be included the edibles mixes and ready-to-serve beverages of the present invention in a flavor enhancing amount. The particular mount of the flavor effective for providing positive flavor characteristics ("flavor enhancing") can depend upon the flavor(s) selected, the flavor impression desired, and the form of the flavor. Usually these noncocoa flavors comprise from 0 to about 40%, preferably from about 10 to about 30%, most preferably from about 15 to about 25%, of the edible mix. In the case of ready-to-serve beverages, these noncocoa flavors comprise from 0 to about 10%, preferably from about 1 to about 3%, most preferably from about 1.5 to about 2.5%, of the ready-to-serve beverage.

H. Optional Minerals and Vitamins

The edible mixes and ready-to-serve beverages of the present invention can also be fortified with other minerals besides iron, as well being fortified with various vitamins, in nutritionally effective amounts. For these other minerals and vitamins, a "nutritionally effective amount" means the mineral or vitamin is included in amount that provides a measurable, nourishing amount of the mineral/vitamin. This typically at least about 3%, more typically more than about 10%, preferably from about 20 to about 200% and, most preferably, from about 20 to about 100% of the RDA for the mineral/vitamin in the consumable product. Of course, it is recognized that the preferred daily intake of any mineral or vitamin can vary with the user.

For edible mixes and ready-to-serve beverages of the present invention, the nutritionally effective amount for the mineral or vitamin will generally comprise more than about 3% of the RDA and preferably from about 10 to about 100% of the RDA, most preferably from about 10 to about 30% of the RDA, per unit portion of the consumable product For example, in the case of calcium, the RDA will range from about 360 mg per 6 kg for infants to about 1200 mg/54–58 kg for females, depending somewhat on age. Moreover, it can be difficult to fortify beverages and other edible products with more than about 20 to about 30% of the RDA of calcium (based per serving) without encountering precipitation and/or organoleptic problems. However, this level of fortification is equivalent to cow's milk in calcium value, and is therefore acceptable.

A particularly desirable vitamin to include in edible mixes and ready-to-serve beverages of the present invention is vitamin C. Any commercially available source of vitamin C or ascorbic acid suitable for inclusion in edible products can be used. Encapsulated vitamin C and edible salts of ascorbic acid can also be used. Preferably from about 25 to about 300% of the RDA is included in the edible mix or beverage (15 mg/240 gm of consumable product or 0.006%, to about 180 mg/240 gm of the consumable product or 0.075%). Most preferably, the amount of vitamin C used included from about 25 to about 150% of the RDA.

Another particularly desirable vitamin to include in edible mixes and ready-to-serve beverages of the present invention is vitamin A. Any commercially available source of vitamin A suitable for inclusion edible products can be used. From about 10 to about 50% of the RDA of vitamin A is preferably added to the dry mix or ready-to-serve beverage. Encapsulated β-carotene can be substituted for the vitamin A. The β-carotene can be encapsulated in dextrin or similar encapsulation materials, for example, encapsulated β-carotene (1% powder) supplied by Roche Vitamins and Fine Chemicals, Nutley, N. J. A level of from about 0.0006% or about 1.5 mg/240 gm beverage provides at least about 25% of the RDA of vitamin A as β-carotene. Preferably, from about 0.00 to about 0.007% β-carotene (from about 0 to about 300% of the RDA of vitamin A) and, most preferably, from about 0.018 to about 0.036% β-carotene (from about 75 to about 150% of the RDA of vitamin A) is used in the dry edible mix or ready-to-serve beverage.

Another particularly desirable vitamin to include in edible mixes and ready-to-serve beverages of the present invention is riboflavin. Any commercially available source of riboflavin suitable for inclusion edible products can be used. Preferably from about 20 to about 200% of the RDA of riboflavin is included in the edible mix or beverage (from about 0.34 mg/240 gm to about 3.4 mg/240 gm of the consumable product. Other vitamins that can be added to the edible mix and ready-to-serve beverages of the present invention include vitamin B1 (e.g., thiamine HCl), vitamin B6, niacin, pantothenic acid, folic acid, vitamin D, vitamin E and vitamin B 12.

Other minerals that can be added to the edible mixes and ready-to-serve beverages of the present invention include calcium, magnesium, zinc, iodine, and copper. Any soluble salt of these minerals suitable for inclusion edible products can be used, for example, calcium carbonate, calcium citrate, calcium malate, calcium-citrate-malate, calcium gluconate, magnesium citrate, magnesium gluconate, magnesium sulfate, zinc chloride, zinc sulfate, potassium iodide, and copper sulfate. A preferred source of calcium is a complex with certain organic acids, and in particular calcium citrate-malate. The preparation of this preferred calcium organic acid complex is described in U.S. Pat. Nos. 4,786,510 and 4,786,518 (Nakel et al) issued Nov. 22, 1988, and U.S. Pat. No. 4,722,847 (Heckert), issued Feb. 2, 1988, all of which are incorporated by reference.

These minerals are included in the edible mixes and ready-to-serve beverages of the present invention in a "nutritionally effective" amount. By "nutritionally effective amount" is meant that the mineral source is included in an amount that provides a measurable, nourishing amount of the particular mineral. However, the particular mineral salt used and the level will depend upon its interaction with the iron source and other ingredients in the edible mix or ready-to-serve beverage.

I. Other Optional Ingredients

Other minor ingredients typically present in edible mixes or ready-to-serve beverages can also be included. These other ingredients include preservatives such as benzoic acid and salts thereof, sulfur dioxide, butylated hydroxyanisole, butylated hydroxytoluene, etc. Also, typically included are colors derived either from natural or synthetics sources. Salt, e.g., sodium chloride, and other flavor enhancers can be used to improve the flavor imparted by the edible mix or ready-to-serve beverage of the present invention.

Emulsifiers are also typically included in edible mixes and ready-to-serve beverages of the present invention. Emulsifiers help to disperse the milk solids and the cocoa in the water or milk that is used to prepare the ready-to-serve beverage, or the reconstituted consumable product in the case of edible mixes. Any food grade emulsifier suitable for inclusion in edible products can be used. Examples of suitable emulsifiers include mono and di-glycerides of long chain fatty acids, preferably saturated fatty acids, and most preferably, stearic and palmitic acid mono- and diglycerides. Propylene glycol esters are also useful in these edible mixes. Lecithin is an especially preferred emulsifier for use in the edible mixes and ready-to-serve beverages of the present invention.

J. Total Water and Fat Levels in Edible Mixes and Minimizing Vitamin C Degradation The ferrous ion from the highly bioavailable iron sources can catalyze the degradation of vitamin C, can oxidize to form undesirable colored ferric oxide, or can react with polyphenols to cause unacceptable colored products. These reactions are accelerated if the moisture content (i.e., water activity) in the dry mix is too high. It is therefore desirable to keep the total water level in the edible mixes of the present invention below about 5%. Preferably the water content is below about 3%, and is typically in the range of from about 2 to about 3%. Also, because the ferrous ion can cause rancidity by oxidizing lipids, the total fat level is also preferably kept below about 5% so that the oxidation is not pronounced. Preferably, the fat content is below about 4%, and is typically in the range of from about 2.5 to about 3.5%.

In the case of ready-to-serve beverages of the present invention, the moisture content and water activity will be high. In the presence of oxygen and ferrous iron, vitamin C can be rapidly degraded in these ready-to-serve beverages. This problem can be reduced by excluding oxygen during processing and storage of the ready-to-serve beverage. The use of air resistant packages and minimizing the oxygen level in the beverage during bottling or packaging of it, such as by degassing or eliminating head space air (e.g., by flushing with nitrogen), are suitable methods for reducing oxygen induced vitamin C loss.

K. Preparation of Iron Fortified Edible Mixes

The edible mixes of the present invention are typically formulated as a dry mix. In the case of dry beverage mixes, the mix is typically diluted by a factor of from about 3 to about 50 to make the reconstituted beverage that is consumed. Accordingly, this dilution factor needs to be considered when preparing the edible mix since it is more concentrated than the reconstituted consumable product.

The preferred overall method for preparing the dry edible mixes of the present invention involves separately preparing mixtures of the dry ingredients and the emulsifier (which may be liquid). As noted earlier, it is important to the preparation of a stable dry edible mix that the iron and vitamin C not be combined wet or agglomerated with water or steam. The ingredients should be as anhydrous as possible and mixed in a dry state.

While all of the ingredients can be mixed together, it has been found that the preparation of three to five separate mixtures are best if emulsifiers and other vitamin supplements are included. These mixtures are: (1) vitamins other than vitamin C and the iron source; (2) vitamin C and the source of iron; and (3) the cocoa and milk solids. These premixes are then blended into a homogeneous dry edible composition with the sweetener.

Any conventional equipment for handling and mixing powders can be used. Preferably, the equipment will be capable of breaking up lumps and thoroughly mixing the powders, such as a micropulverizer. The dry ingredients should be sifted if there are lumps that are not being broken up during the blending.

When emulsifiers (e.g., lecithin) are included, these emulsifiers should be melted and blended with the other ingredients as a liquid. Preferably, the oil soluble vitamins, such as vitamin A and E, are dissolved in the emulsifier that is then blended with the other edible mix ingredients.

L. Preparation of Iron Fortified Ready-to-Serve Beverages

Preparation of ready-to-serve beverages can be carried out in a similar manner to the preparation of beverage mixes, at least as it relates to the dry ingredients such as the cocoa powder, iron source, milk solids, vitamins and other minerals, etc. The primary difference is the addition of an aqueous fluid, typically in an mount of from about 60 to about 98%, preferably from about 75 to about 95%, of the finished ready-to serve beverage product. Suitable aqueous fluids include water and milk. Suitable milk sources include whole milk, low fat milk, skim milk, milk fluids made by reconstituting milk powders with water and the like.

EXAMPLES

The following includes specific embodiments of the beverage mixes, and processes for preparing them, according to the present invention.

Example I

A chocolate powder mix is prepared from the following ingredients:

| Ingredient | Amount (percent) |
| --- | --- |
| Granular Sucrose | 67.16 |
| Non-fat Dry Milk | 15.00 |
| Sodium Chloride | 0.40 |
| Fermented Cocoa Powder, 14% fat | 16.00 |
| Colors | 0.07 |
| Citric Acid | 0.50 |
| Butylated Hydroxytoluene (BHT) | 0.0004 |
| Vitamin Mix (vitamin C, riboflavin, niacin, thiamin and pantothenic acid) | 0.46 |
| Ferrous Fumarate | 0.06 |
| Mineral Mix (tribasic calcium phosphate) | 0.05 |
| Artificial Chocolate Flavor | 0.30 |

The chocolate powder is prepared by mixing the above ingredients together until the powder is homogeneous. A drinkable beverage is prepared by adding 25 g. of this powder to 240 ml of milk and then stirring vigorously.

Example II

A chocolate powder mix is prepared from the following ingredients:

| Ingredient | Amount (percent) |
| --- | --- |
| Granular Sucrose | 52.218 |
| Creamer | 19.1 |
| Sodium Chloride | 0.35 |
| Fermented Cocoa Powder, 14% fat | 3.59 |
| Xanthan Gum and Carboxymethylcellulose | 0.418 |
| Citric Acid | 0.5 |

-continued

| Ingredient | Amount (percent) |
| --- | --- |
| Butylated Hydroxytoluene (BHT) | 0.014 |
| Vitamin Mineral Mix as in Example I | 0.27 |
| Ferrous Fumarate | 0.04 |
| Non Cocoa Flavors | 23.5 |

The chocolate beverage powder is prepared similar to Example I. A drinkable beverage is prepared by adding 42 g. of this powder to 240 ml of water and then stirring vigorously.

Example III

A ready-to-serve chocolate beverage is prepared from the following ingredients:

| Ingredient | Amount (percent) |
| --- | --- |
| Milk | 89.500 |
| Sugar | 7.057 |
| Cocoa | 1.680 |
| Non-Fat Dry Milk | 1.575 |
| Vitamin/Mineral Mix | 0.059 |
| Sodium Chloride | 0.042 |
| Citric Acid | 0.053 |
| Butylated Hydroxytoluene (BHT) | 0.00003 |
| Flavor | 0.032 |
| Carageenan | 0.002 |

The above ingredients are mixed together until homogeneous. This homogeneous mixture is pasteurized by heating to 135°–150° C. for 5 seconds and then aseptically packaged to provide the ready-to-serve beverage.

What is claimed is:

1. A nutritional dry chocolate-flavored beverage mix, which comprises:

(a) from about 2 to about 20% cocoa (b) from about 10 to about 100% of the RDA of an iron source selected from the group consisting of ferrous sulfate, ferrous fumarate, ferrous succinate, ferrous gluconate, ferrous lactate, ferrous tartarate, ferrous citrate, ferrous amino acid chelates, ferric saccharate, ferric ammonium citrate, ferric citrate, ferric sulfate, and mixtures thereof in an amount sufficient to provide;

(c) from about 0.5 to about 15% milk solids;

(d) an effective amount of a sweetener;

(e) a buffering agent selected from the group consisting of edible buffering acids, water-soluble salts of edible buffering acids, and mixtures thereof in an amount sufficient such that the beverage mix, when dissolved in an aqueous liquid provides a pH from about 3.0 to about 6.5.

2. The beverage mix of claim 1 wherein said iron source selected from the group consisting of ferrous fumarate, ferrous amino acid chelates and mixtures thereof.

3. The beverage mix of claim 2 wherein said ferrous amino acid chelates have the formula:

Fe(L)$_2$ wherein L is an alpha-amino acid reacting ligand selected from the group consisting of glycine, lysine, and leucine.

4. The beverage mix of claim 2 wherein said buffering agent selected from the group consisting of citric acid, malic acid, fumaric acid, adipic acid, tartaric acid, succinic acid, ascorbic acid, phosphoric acid, water soluble salts of said acids and mixtures thereof.

5. The beverage mix of claim 4 wherein said buffering agent is in an amount sufficient to such that the edible mix, when dissolved in an aqueous liquid, provides a pH from about 5.0 to about 6.0.

6. The beverage mix of claim 2 which comprises from about 3.5 to about 16% cocoa.

7. The beverage mix of claim 2 which comprises from about 10 to about 95% sugar.

8. The beverage mix of claim 7 which comprises from about 55 to about 70% sugar.

* * * * *